(12) United States Patent
Hashimoto et al.

(10) Patent No.: US 6,876,431 B2
(45) Date of Patent: Apr. 5, 2005

(54) LIQUID CRYSTAL OPTICAL ELEMENT AND AN OPTICAL DEVICE

(75) Inventors: Nobuyuki Hashimoto, Iruma (JP); Shinya Sato, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 133 days.

(21) Appl. No.: 10/293,256

(22) Filed: Nov. 14, 2002

(65) Prior Publication Data

US 2003/0095218 A1 May 22, 2003

(30) Foreign Application Priority Data

Nov. 16, 2001 (JP) ........................................ 2001-351542

(51) Int. Cl.⁷ ................................................. G02F 1/13
(52) U.S. Cl. ................................. 349/201; 369/112.02
(58) Field of Search ................................ 349/201, 202, 349/142, 110; 369/112.01, 112.02

(56) References Cited

U.S. PATENT DOCUMENTS

| | | | | |
|---|---|---|---|---|
| 3,731,986 A | * | 5/1973 | Fergason | 349/33 |
| 4,176,917 A | * | 12/1979 | Yasutake | 349/142 |
| 4,591,240 A | * | 5/1986 | Masaki et al. | 349/110 |
| 6,366,335 B1 | * | 4/2002 | Hikmet et al. | 349/193 |
| 6,469,822 B1 | * | 10/2002 | Zhu | 359/316 |
| 6,480,454 B1 | * | 11/2002 | Wada et al. | 369/112.02 |
| 6,529,254 B1 | * | 3/2003 | Suganuma | 349/104 |
| 6,532,202 B1 | * | 3/2003 | Wada et al. | 369/112.02 |
| 6,577,376 B1 | * | 6/2003 | Shih | 349/202 |
| 6,678,232 B2 | * | 1/2004 | Ogasawara et al. | 369/112.02 |
| 6,690,500 B2 | * | 2/2004 | Ogasawara et al. | 359/245 |

* cited by examiner

Primary Examiner—Tarifur R. Chowdhury
Assistant Examiner—David Chung
(74) Attorney, Agent, or Firm—Finnegan, Henderson, Farabow, Garrett & Dunner, L.L.P.

(57) ABSTRACT

A compact liquid crystal optical element for optical modulation and a compact optical device. A liquid crystal optical element for optical modulation is prepared by connecting two transparent substrates, each formed with a transparent electrode and an orientation film, with a sealing member, leaving a clearance between the two transparent substrates. On at least one surface of at least one of these transparent substrates, a diaphragm is formed using a shielding member. With this arrangement, it is possible to provide a more compact liquid crystal optical element than has been conventionally available. At the same time, it is possible to substantially reduce the occurrence of noise. Therefore, it is possible to provide a liquid crystal optical element and an optical device having excellent performance.

38 Claims, 9 Drawing Sheets

LIQUID CRYSTAL OPTICAL ELEMENT AND AN OPTICAL DEVICE

TECHNICAL FIELD

This invention relates to a liquid crystal optical element and an optical device using the same. The invention particularly relates to a compact liquid crystal optical element and an optical device using the same, for modulating light of high coherence (high-coherence light) such as a laser beam and a super-luminescent diode.

BACKGROUND OF THE INVENTION

A liquid crystal optical element for optical modulation, particularly for light phase modulation, which is different from a normal liquid crystal element for display, has been used for correcting aberration in an optical pickup device for a DVD or the like. This liquid crystal optical element optically corrects wave aberration (mainly coma) that is generated in a disk substrate of a DVD due to the inclination of the optical axis of a laser beam irradiated onto the DVD.

FIG. 9A and FIG. 9B are views showing the concept of a structure of a liquid crystal optical element 20 that is used in a conventional optical pickup device. FIG. 9B is a cross-sectional view cut along the line A–A' in FIG. 9A. The liquid crystal optical element 20 is constructed of two transparent substrates, each formed with a transparent electrode and an orientation film, that are adhered together with a sealing agent, leaving a predetermined clearance between the two transparent substrates. Liquid crystal is sealed in this clearance. As shown in FIG. 9A and FIG. 9B, the liquid crystal optical element 20 is formed with a light-receiving surface for making a laser beam incident thereto. Four sides of this surface are surrounded by a sealing member 1.

A first transparent substrate 7 of the liquid crystal optical element 20 is formed with a plain electrode 8 as a transparent opposite electrode, and an alignment film 9. A second transparent substrate 11 of the liquid crystal optical element 20 is formed with a transparent electrode 4 for correcting aberration, a transparent wiring pattern 5 for the transparent electrode 4, and an alignment film 10. The first transparent substrate 7 and the second transparent substrate 11 are adhered to each other with the sealing member 1, with a predetermined clearance left between the transparent substrates. A liquid crystal 6 is sealed in this clearance. The first and second transparent substrates are held with the sealing member. In actual practice, various patterns for correcting aberration, not shown in the drawings, are formed on the transparent electrode 4 for correcting aberration.

An effective diameter 2 of a laser beam incident to the liquid crystal optical element 20 is shown in FIG. 9A. The "effective diameter" will hereinafter refer to a main beam diameter that can be utilized effectively by an objective lens (for example, an objective lens 15 shown in FIG. 10) on the liquid crystal optical element on geometrical optical design, involving no positional deviation or diameter change in the laser beam.

In recent years, there has been strong demand for reducing the size of the optical pickup device for a DVD. To meet this demand, it is also necessary to reduce the size of the liquid crystal optical element 20. However, as the liquid crystal optical element 20 has the four sides of the light-receiving surface surrounded by the sealing member 1, this sealing member 1 occupies some area. In order to reduce the size of the liquid crystal optical element 20, it is has been considered to design and manufacture it by setting the light-receiving surface to have a size as close as possible to the effective diameter 2, thereby to reduce the area of the sealing member 1.

However, there is a drawback in that the performance of the liquid crystal optical element is lowered when the size of the light-receiving surface is set close to the size of the effective diameter 2. The main reason for this is that impurity and uncured resin components from the sealing member 1 affect the liquid crystal 6 or the alignment films 9 and 10, where the sealing member 1 is usually made of resin and the alignment films 9 and 10 are positioned near the sealing member 1. Therefore, in order to avoid the above problem, it is necessary to design and manufacture the light-receiving surface to have a size sufficiently larger than the effective diameter 2.

Further, in order to drive the aberration-correcting transparent electrode 4 disposed on the light-receiving surface, it is necessary to arrange the transparent wiring pattern 5 near the electrode 4. However, this has a further drawback, described below, on the transparent wiring pattern 5 and the area between the transparent electrode 4 and the transparent wiring pattern 5.

FIG. 10 shows one example of an optical pickup device that uses the conventional liquid crystal optical element 20. As shown in FIG. 10, a laser beam emitted from a laser beam source 12 is changed into a parallel beam by a collimator lens 13, the diameter of the parallel beam being regulated by a diaphragm 14. The beam passes through the liquid crystal optical element 20, and is irradiated to a DVD 16 by an objective lens 15.

The liquid crystal optical element 20 is provided with the transparent electrode 4 for correcting aberration, in order to cover the range of the effective diameter 2 that is designed in advance. However, the effective diameter 2 is a value obtained based on a geometrical optical calculation, and an actual laser beam has a wave optical diffraction spread. Therefore, a luminous flux 17 of a laser beam that is incident to the liquid crystal optical element 20 becomes larger than the effective diameter 2. The laser beam has a foot component, though at a low level, at the outside of the effective diameter 2.

The liquid crystal optical element 20 has an area where the transparent wiring pattern 5 is provided, at the outside of the transparent electrode 4, as described above. Also, the area is disposed on the liquid crystal 6 sealed within the sealing member 1. Further, the transparent electrode 4 for correcting aberration has a edge.

When the foot component of a laser beam is irradiated to this area, the beam is diffracted and scattered to generate a normal diffraction beam and a normal scattering beam 18, based on the edge of the transparent electrode 4 and the transparent wiring pattern 5. At the time of driving the transparent electrode 4 for correcting aberration, a current is supplied to the transparent wiring pattern 5, and the liquid crystal 6 is driven between the transparent electrode 4 and the transparent opposite electrode 8. When the foot component of the laser beam is irradiated to the liquid crystal 6, a modulation beam 19 is generated.

The normal diffraction beam and the normal scattering beam 18 interfere with the laser beam for irradiating the DVD, and this degrades the laser beam. As the laser beam has high coherence, the diffraction beam and the scattering beam cause a bad influence to the optical system. The diffraction beam and the scattering beam become a noise beam, which lowers the intensity of the effective transmission light. According to the results of measurement carried out by the present inventor, the diffraction beam and the scattering beam became a noise beam, and this lowered the intensity of the effective transmission light by five percent.

The modulation beam 19 causes the intensity of the laser beam for irradiating the DVD to modulate. In particular, at the time of writing to the DVD in a DVD-R system, it is necessary to keep the intensity of the laser beam constant. Therefore, the modulation beam 19 is the trouble to be solved.

For the above reasons, according to the conventional liquid crystal optical element, it has been necessary to dispose the transparent wiring pattern 5 on an outer portion separated sufficiently from the area to which the foot component of the laser beam is irradiated. Consequently, the liquid crystal optical element 20 has had to have a larger size, thereby hindering reduction in the size of the optical pickup device.

The diaphragm 14 disposed in the optical path of the laser beam between the laser beam source 12 and the liquid crystal optical element has not been able to sufficiently shield the foot component of the laser beam. Viewed at the wave optics, the laser beam that has passed through the diaphragm 14 is propagated to the liquid crystal optical element 20 while expanding its diameter due to the diffraction between the laser beam and the diaphragm 14.

SUMMARY OF THE INVENTION

It is therefore an object of the present invention to provide a compact liquid crystal optical element.

It is another object of the present invention to provide a compact liquid crystal optical element capable of restricting the occurrence of beam scattering and a diffraction beam attributable to the foot component of a laser beam.

It is a further object of the present invention to provide a compact liquid crystal optical element capable of restricting the occurrence of a modulation beam attributable to the foot component of a laser beam.

It is still another object of the present invention to provide a compact liquid crystal optical element capable of correcting aberration without degrading a laser beam due to a scattering beam, a diffraction beam or a modulation beam attributable to the laser beam.

In order to achieve the above objects, according to one aspect of the present invention, there is provided a liquid crystal optical element comprising a first transparent substrate, a second transparent substrate, a liquid crystal provided between the first and second transparent substrates, a sealing member for sealing the liquid crystal, a transparent opposite electrode provided on the first substrate, a transparent electrode for modulating light phase provided on the second substrate, a transparent wiring pattern for driving the transparent electrode provided on the second substrate, and a shielding member having an opening and for shielding the edge of the transparent electrode or the transparent wiring pattern.

According to another aspect of the present invention, there is provided an optical device comprising a beam source; a liquid crystal optical element including a first transparent substrate, a second transparent substrate, a liquid crystal provided between the first and second transparent substrates, a sealing member for sealing the liquid crystal, a transparent opposite electrode provided on the first substrate, a transparent electrode for modulating light phase provided on the second substrate, a transparent wiring pattern for driving the transparent electrode provided on the second substrate, and a shielding member having an opening and for shielding the edge of the transparent electrode or the transparent wiring pattern; and an objective lens for condensing a beam passed through the liquid crystal optical element onto an object.

In the liquid crystal optical element or the optical device relating to the present invention, it is preferable that the external periphery of the opening be in a substantially circular or oval shape. It is more preferable that the opening pass substantially the whole of an effective magnetic flux of an incident beam or an emission beam.

Further, in the liquid crystal optical element or the optical device relating to the present invention, it is preferable that the shielding member be a metal film (chrome thin film or the like), and the shielding member may be composed of a plurality of members.

Further, in the liquid crystal optical element or the optical device relating to the present invention, it is preferable that the shielding member be provided on the first or second transparent substrate on the liquid crystal side.

Further, in the liquid crystal optical element or the optical device relating to the present invention, it is preferable that the liquid crystal optical element or the optical device further comprise a sealing member disposed between the first and second transparent substrates to seal the liquid crystal. It is also preferable that the shielding member be provided so as not to extend to a lower portion of the sealing member.

Further, in the liquid crystal optical element or the optical device relating to the present invention, it is preferable that the shielding member be separated into a plurality of members with slits, and the shielding member may have a light-absorbing layer.

Further, in the liquid crystal optical element or the optical device relating to the present invention, the first or second transparent substrate may be colored.

DETAILED DESCRIPTION OF THE PREFERRED EMBODIMENTS

While the present invention can be applied to various optical devices, explanation will be based on examples of an optical pickup device for a DVD. Further, as it is general to use a laser beam in this type of device at present, the explanation will be based on the assumption that a laser beam is used.

Figure 1A:
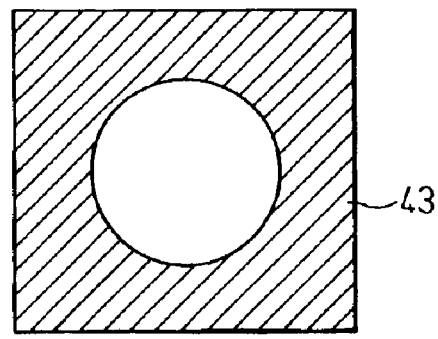
FIG. 1A shows a shielding member.
Figure 1B:
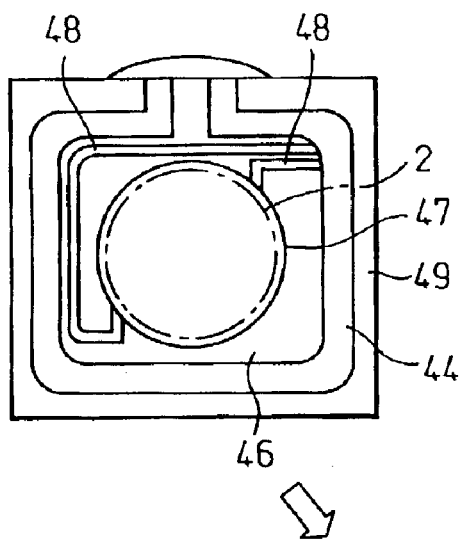
FIG. 1B shows portions of a liquid crystal optical element excluding the shielding member.
Figure 1C:
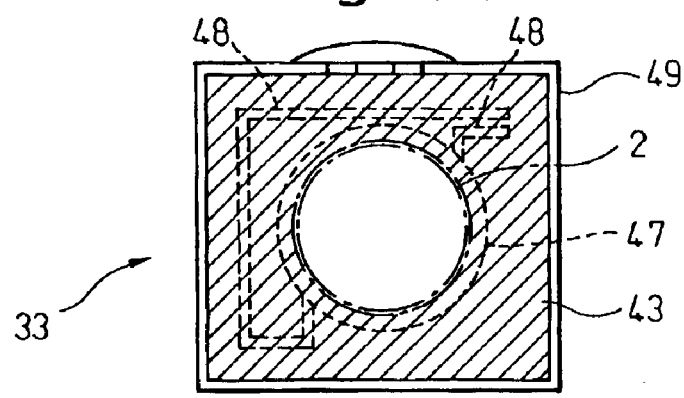
FIG. 1C shows a liquid crystal optical element with a built-in shielding member relating to the present invention.

FIGS. 1A to 1C are views that show the concept of a structure of a liquid crystal optical element 33 relating to the present invention, and do not show a manufacturing method. FIG. 1A shows a shielding member 43. FIG. 1B shows portions of the liquid crystal optical element excluding the shielding member 43. In FIG. 1B, a transparent electrode 47 for correcting aberration and a transparent wiring pattern 48 for driving the transparent electrode 47 are provided in the portion of a liquid crystal 46 in which a sealing member 44 has been sealed. The transparent electrode 47 and the transparent wiring pattern 48 can take various modified patterns without being limited to patterns shown in FIG. 1B. The shielding member 43 shown in FIG. 1A is formed on at least one of a pair of transparent electrodes (not shown) of the liquid crystal optical element shown in FIG. 1B, thereby to obtain the liquid crystal optical element relating to the present invention. The inner diameter portion of the opening of the shielding member 43 is the light-receiving surface. A detailed explanation of the structure will be given later.

As shown in FIG. 1C, the opening of the shielding member 43 has a substantially circular shape of a diameter slightly larger than an effective diameter 2. Here, it is important that at least the foot component of the laser beam is not irradiated to the transparent wiring pattern 48 to the transparent electrode 47 for correcting aberration, or to the edge of the transparent electrode 47. Therefore, it is possible to use another shape and size of the opening within a range not deviating from the object of the opening. For example, the opening may be polygonal, substantially oval, or another shape which covers a part of the effective diameter 2. Similarly, while the shielding member 43 is square in its external shape in FIG. 1A, the shielding member 43 may also optionally have shape within a range not deviating from the object of the present invention. In other words, shielding member 43 may be circular in shape or the like.

Further, it is not always necessary to cover the whole of the transparent wiring pattern 48 or the whole of the edge of the transparent electrode 47. For example, if a plurality of transparent electrodes for correcting aberration are provided within the light-receiving surface, each of these transparent electrodes has an edge. However, if the edge does not cause bad influence, it is not necessary to shield these ends.

When the shielding member 43 is provided as shown in FIG. 1C, the laser beam is incident only to the transparent electrode 47 for correcting aberration. The shielding member 43 prevents the edge of the transparent electrode 47, the transparent wiring pattern 48, and the area in which the transparent wiring pattern is present from irradiating by the foot component of the laser beam. Therefore, this makes it possible to prevent from generating a normal scattering beam, a normal diffraction beam or a modulation beam that are attributable to the foot component of the laser beam.

In other words, according to the present invention, as shown in FIG. 1C, it is possible to substantially reduce the laser beam that is irradiated to the wiring and the edge of the light-receiving surface. Consequently, it is not necessary to dispose the transparent wiring pattern 48 on an outer portion separated sufficiently from the area to which the foot component of the laser beam is irradiated. This makes it possible to reduce the size of the liquid crystal optical element.

Figure 2:
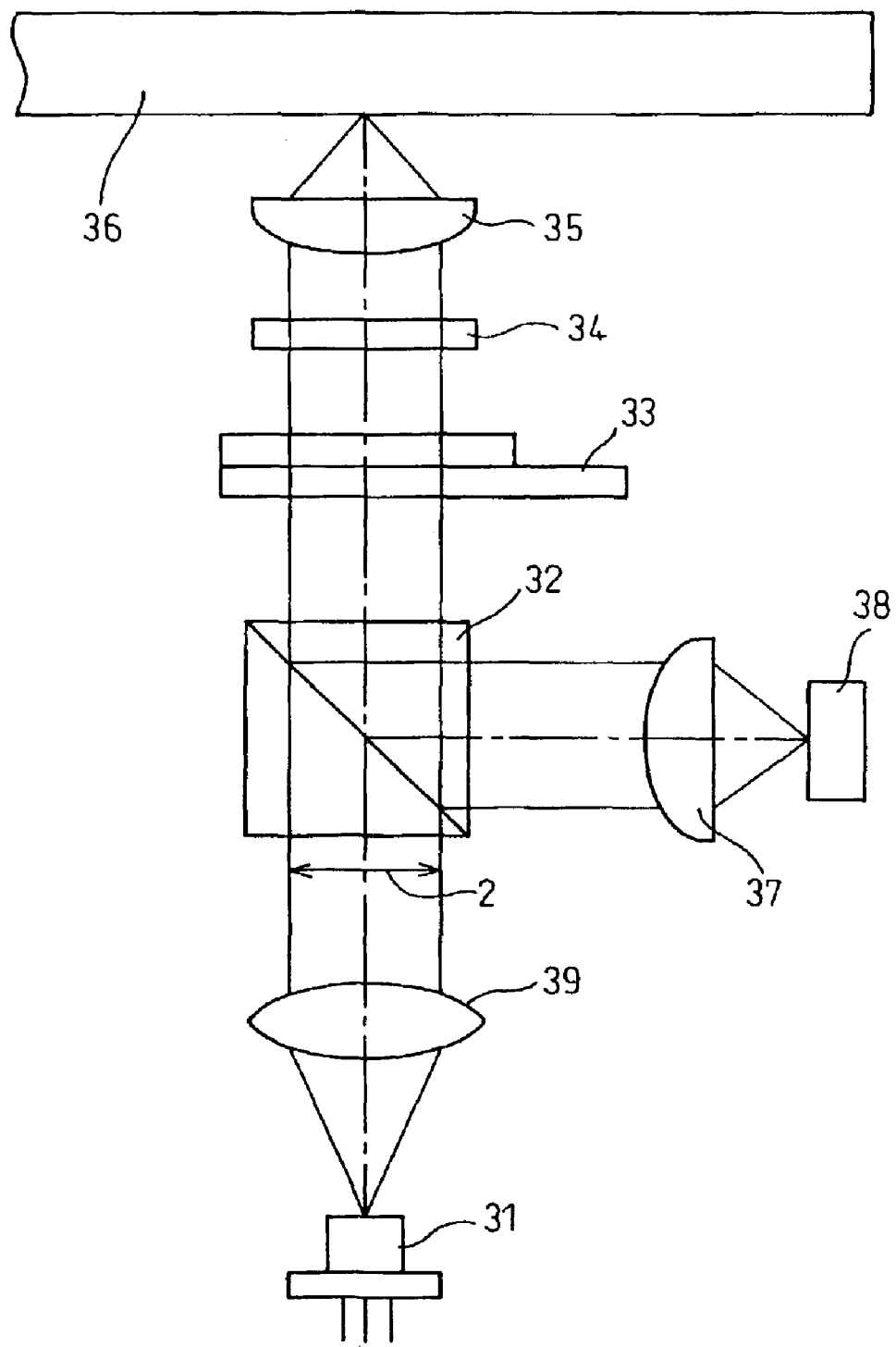
FIG. 2 is a view for explaining the optical device relating to the present invention.

FIG. 2 shows an example of the application of the liquid crystal optical element 33 shown in FIG. 1C to an optical pickup device.

FIG. 2 is a block diagram showing the whole structure of the optical pickup device to which the liquid crystal optical element 33 relating to the present invention is applied. The optical pickup device shown in FIG. 2 is composed of a laser beam source 31, a collimator lens 39, a polarization beam splitter 32, a liquid crystal optical element 33 as an aberration correcting unit, a quarter wavelength plate 34, an objective lens 35, a collective lens 37, and a beam receiver 38.

As shown in FIG. 2, a laser beam emitted from the laser beam source 31 is changed to a parallel beam by the collimator lens 39. After the parallel beam has passed through the polarization beam splitter 32, the beam is incident to the liquid crystal optical element 33. When the laser beam passes through the liquid crystal optical element 33, the laser beam is modulated by the liquid crystal optical element 33, so as to correct aberration. The laser beam then passes through the quarter wavelength plate 34, and is condensed by the objective lens 35 onto the disk (DVD) 36. The optical beam reflected from the disk 36 passes through the objective lens 35 and the quarter wavelength plate 34 again. The optical path of the laser beam is changed by the polarization beam splitter 32, and the laser beam is condensed to the beam receiver 38 via the collective lens 37. While the collimator lens 39 is disposed between the laser beam source 31 and the polarization beam splitter 32 in FIG. 2, the collimator lens may be omitted, depending on the situation.

Figure 3:
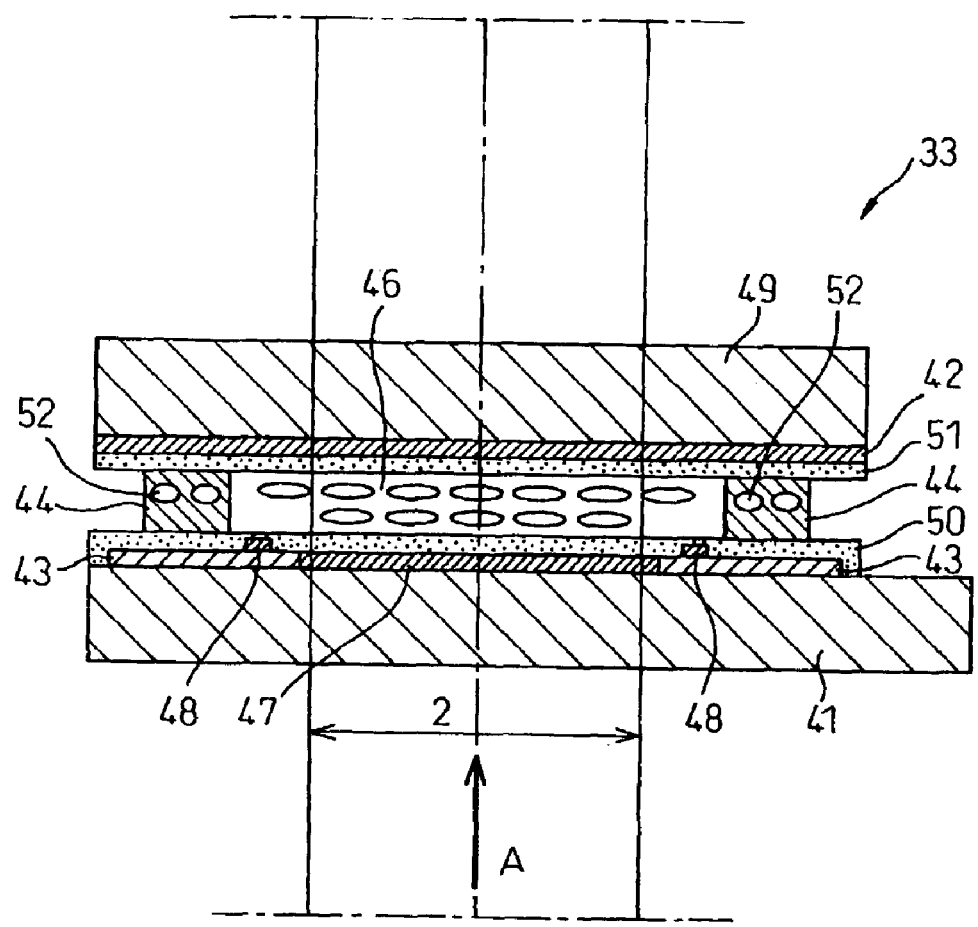
FIG. 3 is a view showing one example of a liquid crystal optical element relating to the present invention.

FIG. 3 is a view showing the structure of the liquid crystal optical element 33 explained with reference to FIGS. 1A to 1C and FIG. 2. An arrow mark A in FIG. 3 shows a direction to which a laser beam emitted from the laser beam source 31 in FIG. 2 is incident to the liquid crystal optical element 33 after passing through the polarization beam splitter 32. As shown in FIG. 3, on a transparent substrate 41 at the laser beam source side, there are formed a transparent electrode 47 for correcting aberration, a transparent wiring pattern 48 for driving the transparent electrode 47, a shielding member 43, and an orientation film 50.

The internal diameter of the opening of the shielding member 43 is set to be slightly larger than an effective diameter 2 (refer to FIG. 1C). However, it is also possible for the internal diameter of the opening of the shielding member 43 to be set substantially the same as the effective diameter 2. From the viewpoint of manufacturing, it is preferable that the transparent wiring pattern 48 for driving the transparent electrode 47 be formed on the shielding member 43 after the shielding member 43 is provided on a transparent substrate 41.

On the other transparent substrate 49 at the disk side, there are formed a transparent opposite electrode 42 and an orientation film 51. Each element shown in FIG. 3 is exaggerated in size for convenience of explanation, and may have a different thickness from the actualone.

As the shielding member 43 is formed on the transparent substrate 41 at the laser beam source 31 side, the laser beam emitted from the laser beam source 31 can be shielded at a position close to the liquid crystal 46. There is no influence of diffraction at the edge of the shielding member 43. Consequently, the foot component of the laser beam is not irradiated to the stage at the end of the transparent electrode 47, the transparent wiring pattern 48, or the area between the transparent electrode 47 and the transparent wiring pattern 48. Therefore, this makes it possible to prevent from generating a normal scattering beam, a normal diffraction beam or a modulation beam. Further, it is possible to dispose the transparent wiring pattern 48 more closer to the transparent electrode 47, which makes it possible to provide a compact liquid crystal element.

As shown in FIG. 3, current-conductive member 52 is provided within the sealing member 44 for connecting the transparent substrates 41 with 49. The current-conductive member 52 electrically connects the transparent writing pattern 48 provided on the transparent substrate 41 on the laser beam source 31 side with the transparent opposite electrode 42 provided on the transparent substrate 49 on the disk side.

Figure 6:
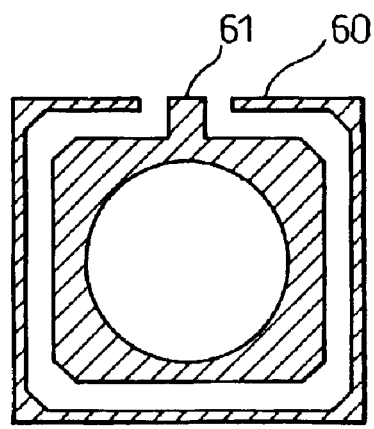
FIG. 6 is a view showing another example of a shielding member.
Figure 7:
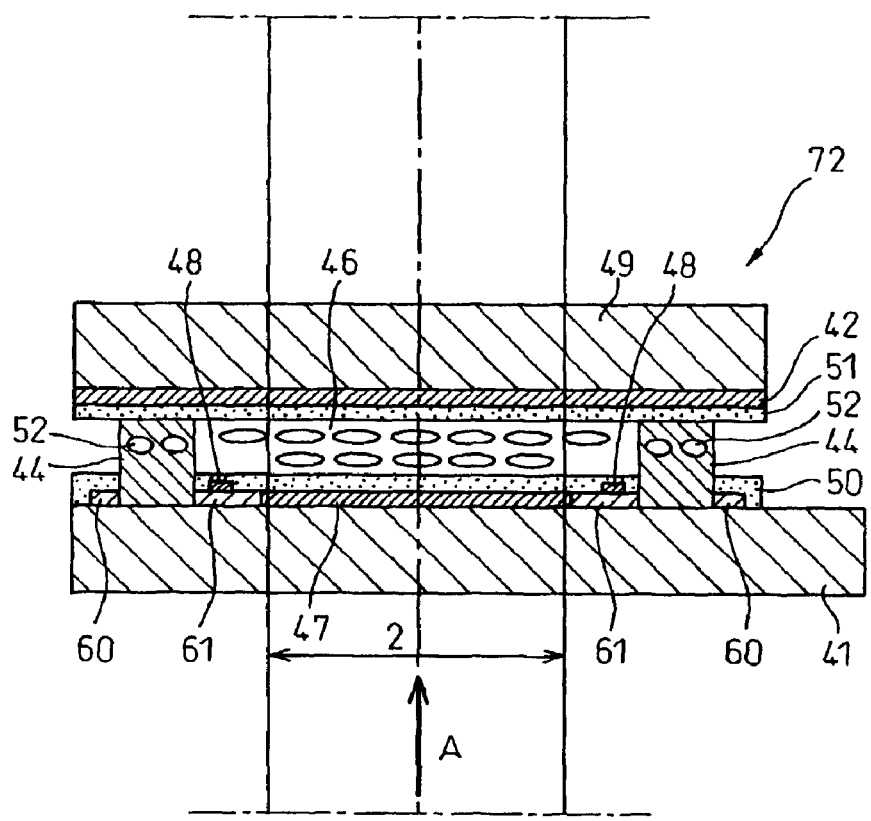
FIG. 7 is a view showing one example of a liquid crystal optical element relating to the present invention using the shielding member shown in FIG. 6.

If a metal film is used as the shielding member 43 and placed close to the current-conductive member 52, as shown in FIG. 3, there is the risk of an electric short-circuit occurring. In this case, a suitable slit that is provided in the shielding member to divide it into two shielding members 60 and 61, as shown in FIG. 6, can be used to avoid unnecessary electrical short-circuiting. FIG. 7 shows a liquid crystal optical element 72 utilizing the two shielding members 60 and 61 shown in FIG. 6. As shown in FIG. 7, the shielding members 60 and 61 are provided so as not to extend to a lower portion of the sealing member 44. Alternatively, it is possible to provide the shielding member (only the shielding member 61 shown in FIG. 6, for example) on only the inside of the area encircled by the sealing member 44 so that the shielding member does not extend to a lower portion of the sealing member 44.

It is possible to use glass, a resin, or the like as the material of the transparent substrates 41 and 49. As shown in FIG. 3, glass is used to form the transparent substrates 41 and 49.

For the shielding members 43, 60 and 61, a shielding sheet adhered to a transparent substrate, a layer coated or printed on a transparent substrate, or a metal film formed on a transparent substrate can be used. A method of pattern forming a metal film (chrome, aluminum, etc.) or a resin layer to prepare the shielding member 43 according to a photolithography technique is preferably used, as it is possible to form the shielding member in a very high-precision positional relationship. The shielding member 43 shown in FIG. 3 is a chrome metal thin film obtained by pattern forming according to a photolithography technique.

The shielding members 43, 60 and 61 may be prepared by using a plurality of shielding films of the same or different qualities at the same or different positions. When the shielding member 43 is formed using a material of high light reflectance such as chrome, for example, there is a risk that the light reflected by the shielding member 43 causes bad influence. To avoid this problem, it is preferable that a light-absorbing layer be provided on at least one surface of the shielding member 43, or another shielding member having the light-absorbing function be used in parallel. Alternatively, a colored transparent substrate as the transparent substrate 41 and a film that does not transmit a light wavelength that passes through the colored transparent substrate may be used, thereby to provide the shielding function based on the co-operation of the transparent substrate and the film. These modifications are also included in the present invention.

Figure 4:
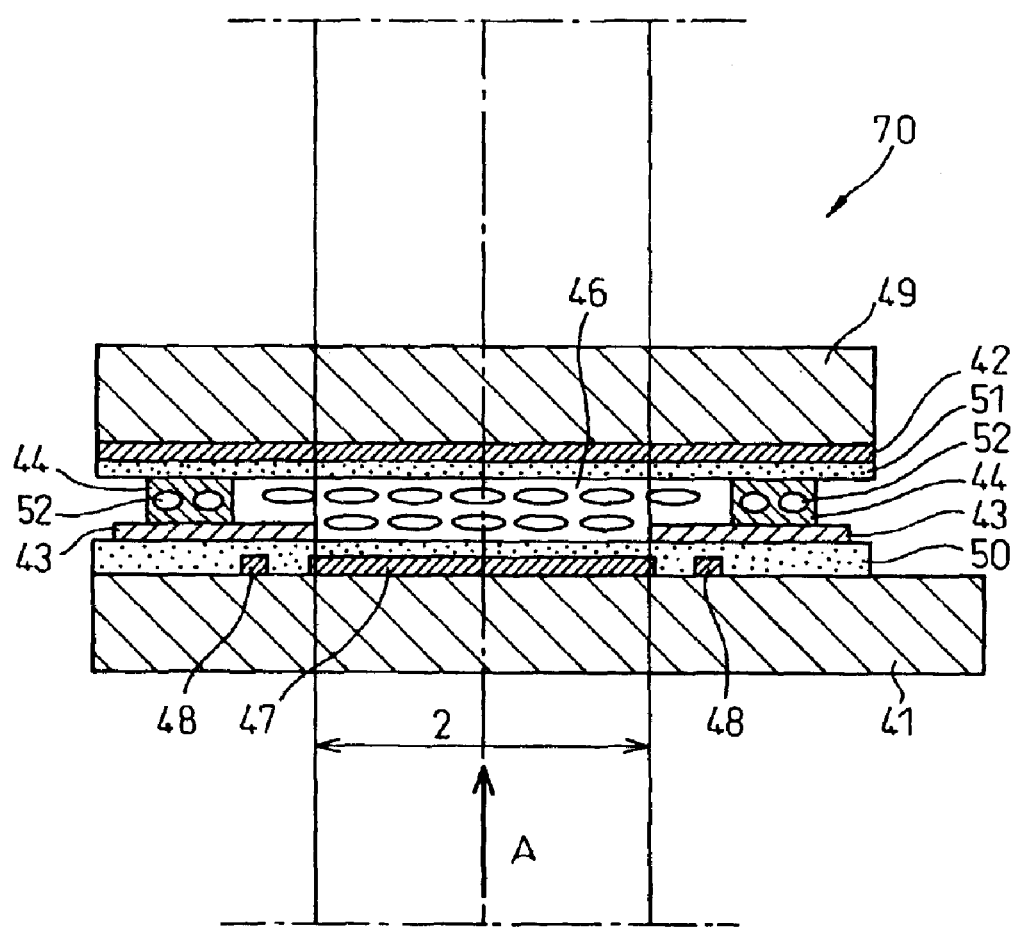
FIG. 4 is a view showing another example of a liquid crystal optical element relating to the present invention.

FIG. 4 shows other liquid crystal optical element 70 relating to the present invention. Portions identical to those shown in FIG. 3 have the same reference numbers. The liquid crystal optical element 70 shown in FIG. 4 can be used for the optical pickup device shown in FIG. 2, in a similar manner to that of the liquid crystal optical element 33 shown in FIG. 3. An arrow mark A in FIG. 4 shows a direction to which a laser beam emitted from the laser beam source 31 in FIG. 2 is incident to the liquid crystal optical element 34 after passing through the polarization beam splitter 32. The liquid crystal optical element 70 shown in FIG. 4 is different from the liquid crystal optical element 33 shown in FIG. 3 in that a shielding member 43 of the liquid crystal optical element 70 is provided on an alignment film 50 on a transparent substrate 41 at the laser beam source side.

Figure 5:
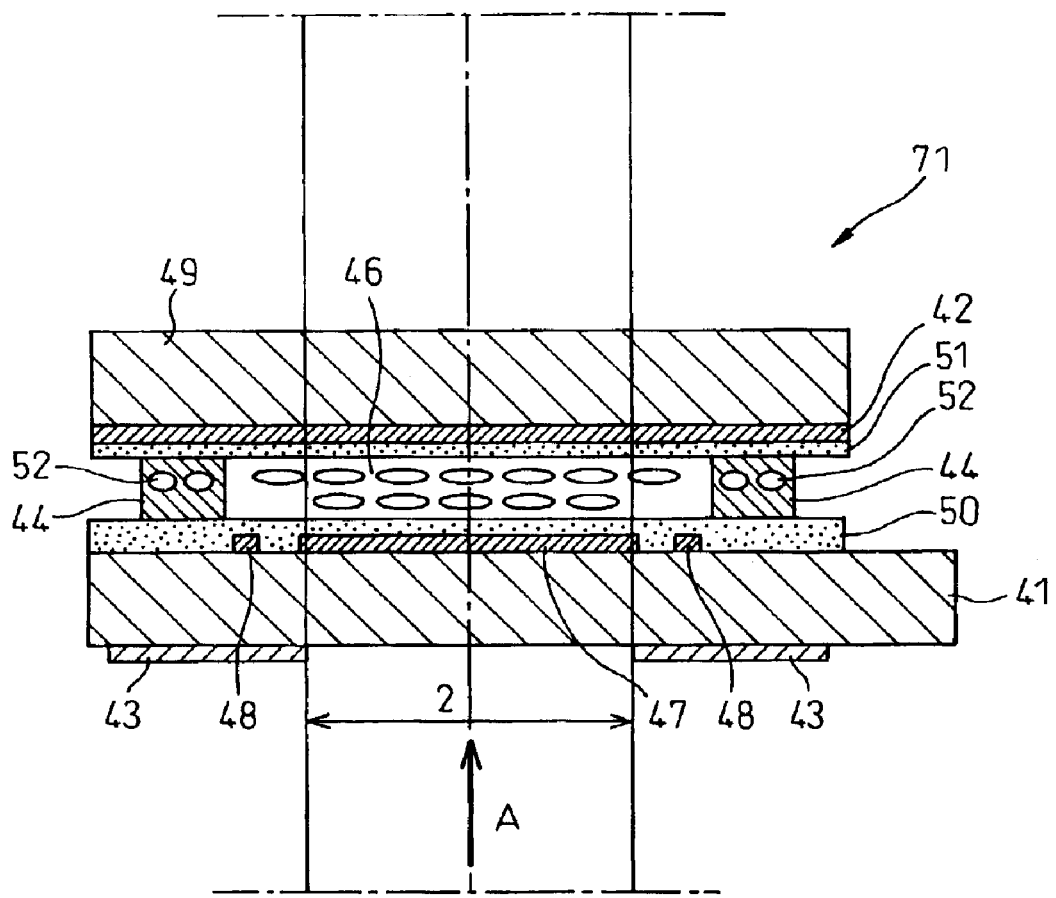
FIG. 5 is a view showing still another example of a liquid crystal optical element relating to the present invention.

FIG. 5 shows other liquid crystal optical element 71 relating to the present invention. Portions identical to those shown in FIG. 3 have the same reference numbers. The liquid crystal optical element 71 shown in FIG. 5 can be used for the optical pickup device shown in FIG. 2, in a similar manner to that of the liquid crystal optical element 33 shown in FIG. 3. An arrow mark A in FIG. 5 shows a direction to which a laser beam emitted from the laser beam source 31 in FIG. 2 is incident to the liquid crystal optical element 35 after passing through the polarization beam splitter 32. The liquid crystal optical element 35 shown in FIG. 5 is different from the liquid crystal optical element 33 shown in FIG. 3 in that a shielding member 43 of the liquid crystal optical element 35 is provided on a transparent substrate 41 at the laser beam source side.

All of the liquid crystal optical elements 33, 70 and 71 shown in FIGS. 3 to 5 respectively have the effect of preventing a beam passed through the liquid crystal optical element from reaching the disk with unnecessary noise. However, the diffraction beam having passed through the transparent wiring pattern 48, in particular, has a characteristic in that it spreads to the effective diameter as the beam is propagated toward the disk. Therefore, it is preferable that the shielding member 43 be disposed as close as possible to the transparent wiring pattern 48 at the beam source side. Accordingly, the liquid crystal optical element 33 shown in FIG. 3 has the highest effect among all of the liquid crystal optical elements 33, 70 and 71.

Figure 8:
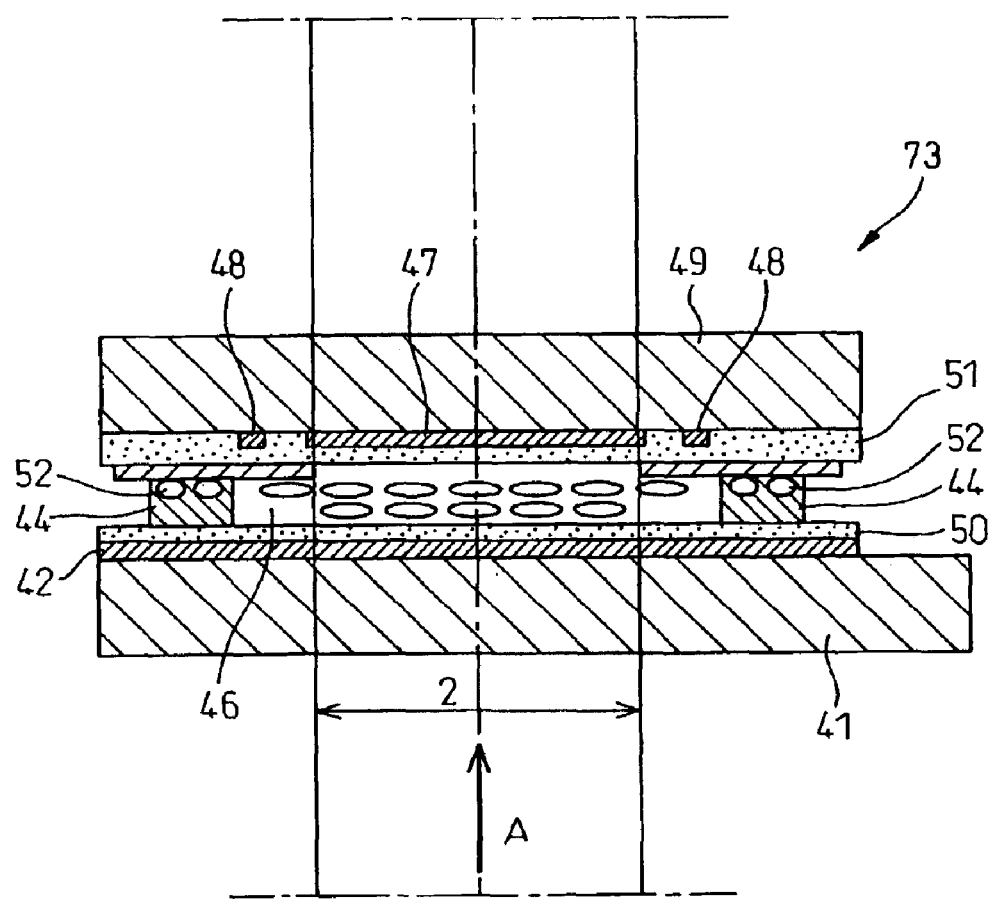
FIG. 8 is a view showing still another example of a liquid crystal optical element relating to the present invention.
Figure 9:
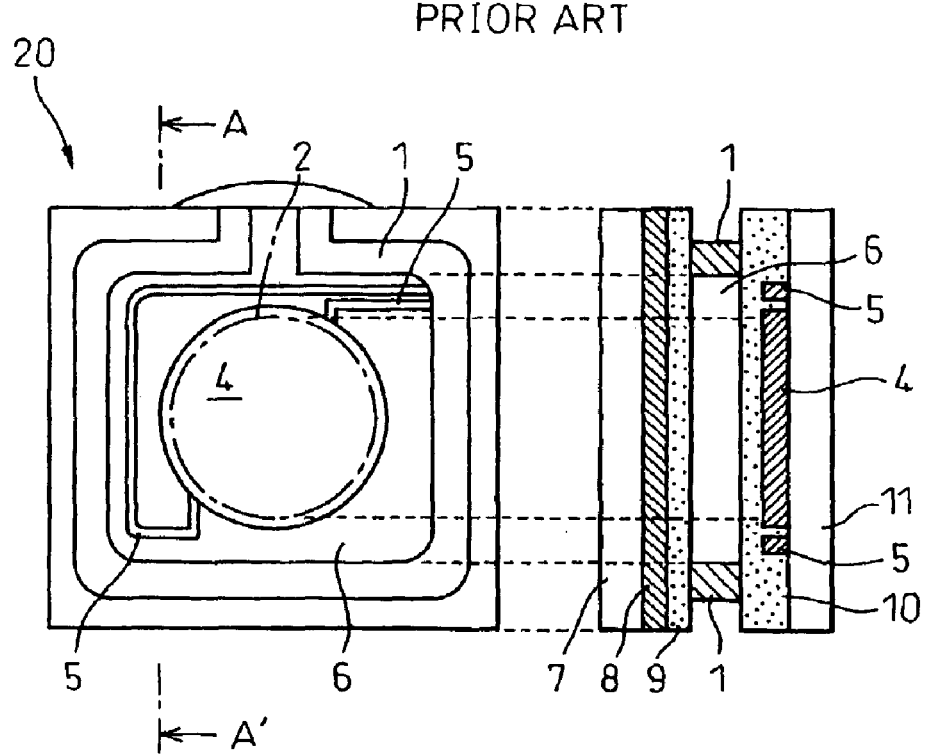
FIG. 9A is a view for explaining a conventional liquid crystal optical element.
FIG. 9B is a cross-sectional view of FIG. 9A.
Figure 10:
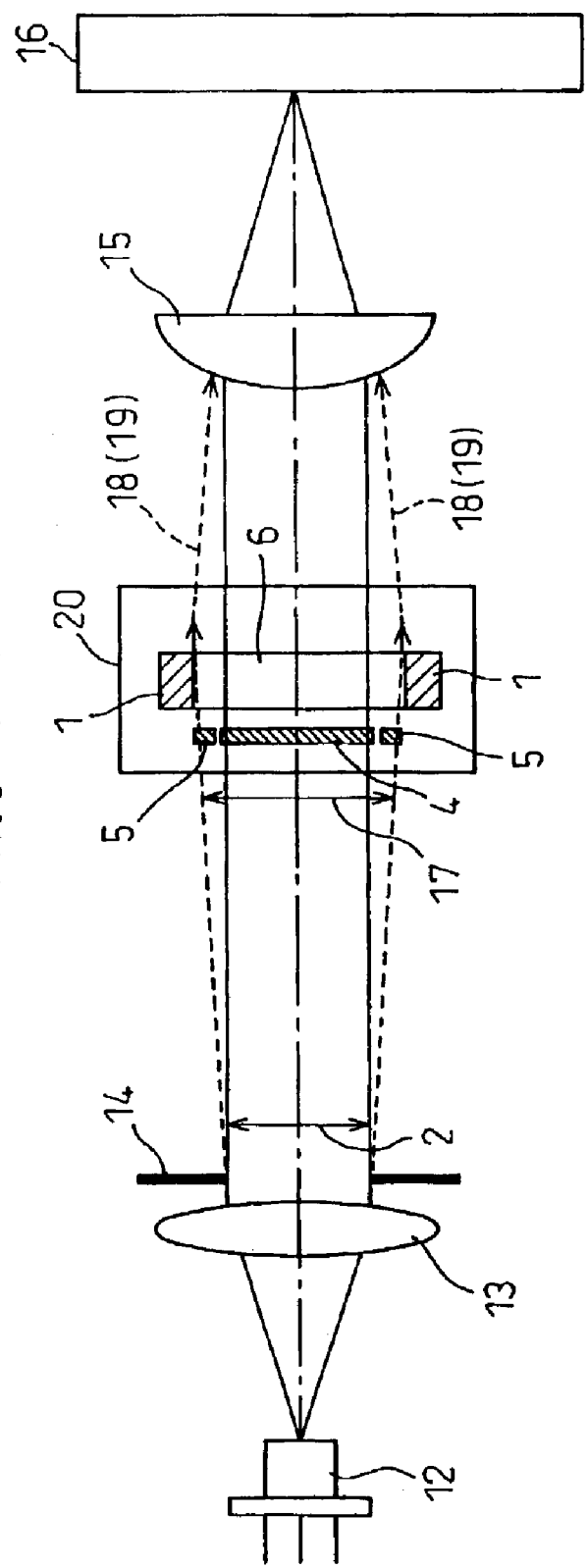
FIG. 10 is a view for explaining a conventional optical device.

FIG. 8 shows other liquid crystal optical element 73 relating to the present invention. Portions identical to those shown in FIG. 3 have the same reference numbers. The liquid crystal optical element 73 shown in FIG. 8 can be used for the optical pickup device shown in FIG. 2, in a similar manner to that of the liquid crystal optical element 33 shown in FIG. 3. An arrow mark A in FIG. 8 shows a direction to which a laser beam emitted from the laser beam source 31 in FIG. 2 is incident to the liquid crystal optical element 73 after passing through the polarization beam splitter 32. In the liquid crystal optical element 73 shown in FIG. 8, a shielding member 43, a transparent electrode 47, a transparent wiring pattern 48 for driving the transparent electrode 47, and an alignment film 51 are formed on a transparent substrate 49 at the disk side. A transparent opposite electrode 42 and an alignment film 50 are formed on a transparent substrate 41 at the beam source side. The shielding member 43 of the liquid crystal optical element 73 shown in FIG. 8 may be provided between the transparent substrate 41 at the beam source side and the transparent opposite electrode 42 as shown in FIG. 3. Alternatively, the shielding member 43 may be provided on the alignment film 50 at the beam source side as shown in FIG. 4, or may be provided on the transparent substrate 41 at the beam source side as shown in FIG. 5.

While the liquid crystal optical element and the optical device using a laser beam have been explained above, it is also possible to effectively apply the present invention to the case of using other beams such as a super-luminescent diode having high coherence, for example.

In the above explanation, the present invention is applied to the liquid crystal optical element for correcting aberration, and the optical pickup device using this liquid crystal optical element. It is also possible to apply the present invention to a liquid crystal optical element that functions as a wavelength plate, and apply the invention to an optical pickup device using this liquid crystal optical element.

Further, the present invention is applied to a hybrid-type liquid crystal optical element which has one transparent electrode 47 for correcting coma aberration and another transparent electrode for correcting spherical aberration instead of the transparent opposite electrode 42, and the optical pickup device using this hybrid-type liquid crystal optical element.

Moreover, the present invention is applied to a hybrid-type liquid crystal optical element which has one transparent electrode 47 for correcting coma aberration and another transparent electrode for correcting astigmatism instead of the transparent opposite electrode 42, and the optical pickup device using this hybrid-type liquid crystal optical element.

As is clear from the above explanation, according to the present invention, it is possible to provide a more compact liquid crystal optical element than has been conventionally available. At the same time, it is possible to substantially reduce the occurrence of noise. Therefore, it is possible to provide a liquid crystal optical element and an optical device having excellent performance.

It will be obvious to those having skill in the art that many changes may be made in the above-described details of the preferred embodiment of the present invention without departing from the underlying principles thereof. The scope of the present invention should, therefore, be determined only by the following claims.

What is claimed is:

1. A liquid crystal optical element comprising:
   a first transparent substrate;
   a second transparent substrate;
   a liquid crystal provided between the first and second transparent substrates;
   a sealing member for sealing the liquid crystal;
   a transparent opposite electrode provided on the first substrate;
   a transparent electrode for modulating light phase provided on the second substrate;
   a transparent wiring pattern for driving the transparent electrode provided on the second substrate; and
   a shielding member having an opening and for shielding the edge of the transparent electrode or the transparent wiring pattern, wherein the external periphery of the opening is in a substantially circular or oval shape.

2. The liquid crystal optical element according to claim 1, wherein the shielding member is provided on the first or second transparent substrate.

3. The liquid crystal optical element according to claim 2, wherein the shielding member is provided on the first or second transparent substrate at the liquid crystal side.

4. The liquid crystal optical element according to claim 1, wherein the shielding member is a metal film.

5. The liquid crystal optical element according to claim 1, wherein the shielding member has a light-absorbing member.

6. The liquid crystal optical element according to claim 1, wherein the first or second transparent substrate is colored, and the shielding member and the first or second transparent substrate co-operate with the colored first or second transparent substrate to shield the end of the transparent electrode and the transparent wiring pattern.

7. An optical device comprising:
   a beam source;
   a liquid crystal optical element including a first transparent substrate, a second transparent substrate, a liquid crystal provided between the first and second transparent substrates, a sealing member for sealing the liquid crystal, a transparent opposite electrode provided on the first substrate, a transparent electrode for modulating light phase provided on the second substrate, a transparent wiring pattern for driving the transparent electrode provided on the second substrate, and a shielding member having an opening and for shielding the edge of the transparent electrode or the transparent wiring pattern; and
   an objective lens for condensing a beam passing through the liquid crystal optical element onto an object.

8. The optical device according to claim 7, wherein the object is an optical disk.

9. The optical device according to claim 7, wherein the shielding member is provided on the first or second transparent substrate.

10. The optical device according to claim 9, wherein the shielding member is provided on the first or second transparent substrate at the liquid crystal side.

11. The optical device according to claim 7, wherein the external periphery of the opening is in a substantially circular or oval shape.

12. The optical device according to claim 7, wherein the shielding member is a metal film.

13. The optical device according to claim 7, wherein the shielding member is composed of a plurality of members.

14. The optical device according to claim 7, further comprising:
    current-conductive members for connecting between the transparent opposite electrode and the transparent wiring pattern, within the sealing member, wherein the shielding member is provided not to extend to the sealing member in which the current-conductive members are present.

15. The optical device according to claim 7, wherein the shielding member is divided into a plurality of members by slits.

16. The optical device according to claim 7, wherein the shielding member has a light-absorbing member.

17. The optical device according to claim 7, wherein the first or second transparent substrate is colored, and the shielding member and the first or second transparent substrate co-operate with the colored first or second transparent substrate to shield the end of the transparent electrode and the transparent wiring pattern.

18. The optical device according to claim 7, wherein an incident beam that is emitted from the beam source and is incident to the liquid crystal optical element is a high-coherence beam.

19. The optical device according to claim 18, wherein the high-coherence beam is a laser beam.

20. The optical device according to claim 19, wherein the opening passes substantially the whole of the effective luminous flux of the beam incident from the beam source to the liquid crystal optical element or the beam emitted from the liquid crystal optical element.

21. A liquid crystal optical element comprising:
    a first transparent substrate;
    a second transparent substrate;
    a liquid crystal provided between the first and second transparent substrates;

a sealing member for sealing the liquid crystal;

a transparent opposite electrode provided on the first substrate;

a transparent electrode for modulating light phase provided on the second substrate;

a transparent wiring pattern for driving the transparent electrode provided on the second substrate; and a shielding member having an opening and for shielding the edge of the transparent electrode or the transparent wiring pattern, wherein the shielding member is composed of a plurality of members.

22. The liquid crystal optical element according to claim 21, wherein the shielding member is provided on the first or second transparent substrate.

23. The liquid crystal optical element according to claim 22, wherein the shielding member is provided on the first or second transparent substrate at the liquid crystal side.

24. The liquid crystal optical element according to claim 21, wherein the shielding member is a metal film.

25. The liquid crystal optical element according to claim 21, wherein the shielding member has a light-absorbing member.

26. The liquid crystal optical element according to claim 21, wherein the first or second transparent substrate is colored, and the shielding member and the first or second transparent substrate co-operate with the colored first or second transparent substrate to shield the end of the transparent electrode and the transparent wiring pattern.

27. A liquid crystal optical element comprising:

a first transparent substrate;

a second transparent substrate;

a liquid crystal provided between the first and second transparent substrates;

a sealing member for sealing the liquid crystal;

a transparent opposite electrode provided on the first substrate;

a transparent electrode for modulating light phase provided on the second substrate;

a transparent wiring pattern for driving the transparent electrode provided on the second substrate;

a shielding member having an opening and for shielding the edge of the transparent electrode or the transparent wiring pattern; and current-conductive members for connecting between the transparent opposite electrode and the transparent wiring pattern, within the sealing member, wherein the shielding member is provided not to extend to the sealing member in which the current-conductive members are present.

28. The liquid crystal optical element according to claim 27, wherein the shielding member is provided on the first or second transparent substrate.

29. The liquid crystal optical element according to claim 28, wherein the shielding member is provided on the first or second transparent substrate at the liquid crystal side.

30. The liquid crystal optical element according to claim 27, wherein the shielding member is a metal film.

31. The liquid crystal optical element according to claim 27, wherein the shielding member has a light-absorbing member.

32. The liquid crystal optical element according to claim 27, wherein the first or second transparent substrate is colored, and the shielding member and the first or second transparent substrate co-operate with the colored first or second transparent substrate to shield the end of the transparent electrode and the transparent wiring pattern.

33. A liquid crystal optical element comprising:

a first transparent substrate;

a second transparent substrate;

a liquid crystal provided between the first and second transparent substrates;

a sealing member for sealing the liquid crystal;

a transparent opposite electrode provided on the first substrate;

a transparent electrode for modulating light phase provided on the second substrate;

a transparent wiring pattern for driving the transparent electrode provided on the second substrate; and a shielding member having an opening and for shielding the edge of the transparent electrode or the transparent wiring pattern, wherein the shielding member is divided into a plurality of members by slits.

34. The liquid crystal optical element according to claim 33, wherein the shielding member is provided on the first or second transparent substrate.

35. The liquid crystal optical element according to claim 34, wherein the shielding member is provided on the first or second transparent substrate at the liquid crystal side.

36. The liquid crystal optical element according to claim 33, wherein the shielding member is a metal film.

37. The liquid crystal optical element according to claim 33, wherein the shielding member has a light-absorbing member.

38. The liquid crystal optical element according to claim 33, wherein the first or second transparent substrate is colored, and the shielding member and the first or second transparent substrate co-operate with the colored first or second transparent substrate to shield the end of the transparent electrode and the transparent wiring pattern.

* * * * *